No. 622,326. Patented Apr. 4, 1899.
W. H. BURNETT.
PIPE CONNECTION.
(Application filed Feb. 10, 1898.)

(No Model.)

WITNESS
B. McComb.
M. G. McClean.

INVENTOR
W. H. Burnett.
BY
Clark Deemer & Co.
ATTORNEYS.

UNITED STATES PATENT OFFICE.

WILLIAM H. BURNETT, OF POUGHKEEPSIE, NEW YORK.

PIPE CONNECTION.

SPECIFICATION forming part of Letters Patent No. 622,326, dated April 4, 1899.

Application filed February 16, 1898. Serial No. 669,764. (No model.)

*To all whom it may concern:*

Be it known that I, WILLIAM H. BURNETT, a citizen of the United States, and a resident of Poughkeepsie, county of Dutchess, and State of New York, have invented certain new and useful Improvements in Pipe Connections, of which the following is a specification, reference being had to the accompanying drawings, forming a part thereof, in which similar letters of reference indicate corresponding parts.

This invention relates to an improved connection more especially adapted for elbows or pipes connecting water-closets with the soil-pipe and with which flushing and venting pipes are ordinarily used.

The principal object of the invention is so to arrange the flushing and venting pipes relatively with the main pipe or elbow that neither pipe connection will interfere with the ordinary flow through the main and soil pipes and so that this flow through the main pipe will not interfere with the inward flow from the flushing-pipe or with the outward flow from the vent-pipe and so that the flushing inflow will not interfere with the venting outflow.

Another object of the invention is to provide a pipe connection of this character which occupies little vertical space between the floor on which the closet stands and the subjacent ceiling of the next story of a building and will admit of easy and fluid-tight coupling of the flushing and venting pipes with the main pipe or elbow in this shallow space.

The invention will be hereinafter fully described, and specifically set forth in the annexed claims.

Figure 1:
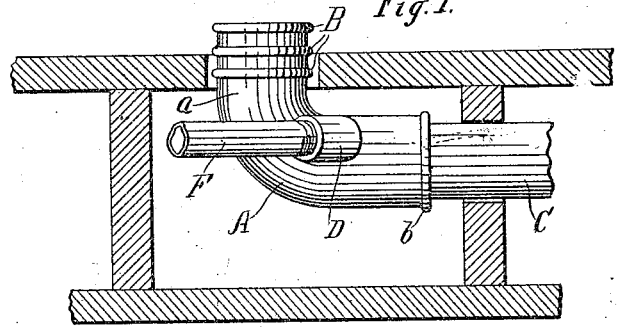
Figure 2:
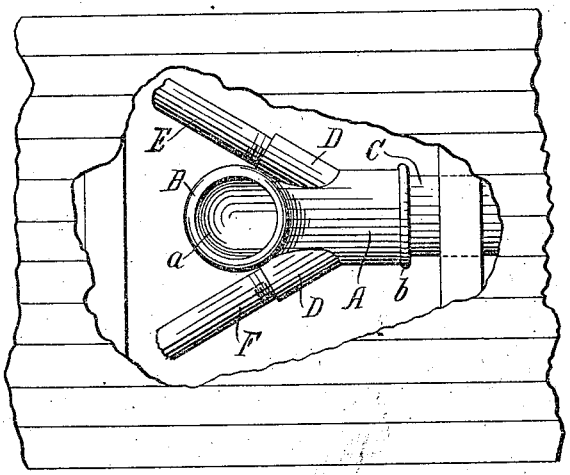

In the accompanying drawings, Figure 1 is a side elevation of the device and a section of the flooring and ceiling; and Fig. 2 is a plan view of the same, a portion of the flooring being broken away.

In one adaptation of my invention I employ an elbow A, preferably of cast metal. Said elbow upon its upright section $a$ is preferably provided with a series of annular ribs B, formed integrally therewith and adapted to retain in position gaskets of the form and material suitable for making a water-tight joint between said elbow and the pipe to which it is fitted. Said ribs also serve as retainers when cement is used to make the connection. At its other end is an annular rib $b$, formed integrally therewith. It is obvious that this end may be provided with a series of ribs and the soil-pipe C placed over the end of the elbow A and secured thereto by means of gaskets or cement; but it is preferred in this instance to screw the said soil-pipe C into the elbow A, said elbow being provided with a suitable thread upon its interior for this purpose. I prefer to form integrally with said elbow A the Y-spurs or thimbles D D, having passages therethrough communicating with the interior of the elbow A. As herein shown, a suitable thread is cut upon the inside of said Y-spurs, into which the gas-vent pipe E and the pipe-fixture F are adapted to screw. A water-tight joint is thus made without the necessity of cutting holes through the walls of the elbow and securing the pipes thereto by means of lead or other soft metal. The screw-threads may be formed on the outside of the spurs or thimbles to match interior threads on the pipes E F in coupling the elbow and pipes A E F by screw-joints in a simple and effective manner in the small space between the floor and the ceiling.

The spurs D are projected from the side walls of the elbow A at a suitable angle, Fig. 2, to prevent the water flowing through the pipe F from entering the inner mouth of the gas-vent pipe E. Said spurs D are preferably located upon the upper half-section of the horizontal portion of said elbow, as shown in Fig. 1, the object thereof being to prevent the interference of any water which may be standing in or flowing through the soil-pipe with the action of the water-supply pipe F and the gas-vent pipe E.

In operation any water which may flow down through the upright portion of the elbow A passes out through the soil-pipe in the usual manner. Any sewerage-gas which may have accumulated in the soil-pipe is free to escape through the gas-vent pipe E, said pipe being above the central line of the horizontal portion of said elbow. At the same time any water which may be flowing through the fixture F will be projected at an angle across the soil-pipe without creating an eddy opposite the mouth of the gas-vent E, and thereby checking the same.

The angle shown in Fig. 2 is not essential to the operation of the device. This angle may be changed to one more acute or to one more obtuse so long as the line of discharge from the pipe F clears the mouth of the gas-vent E by a sufficient distance to prevent an eddying action in the mouth thereof.

In so far as concerns the relative arrangement of the branch pipes E F with their centers or axial planes above the axial plane of the elbow or main pipe A to prevent flow through it interfering with the most effective action of pipes E F, it is immaterial how the branches are coupled with the main pipe or elbow; but the screw-threaded connection is specially advantageous, as it may be most easily made in the shallow space between the floor and ceiling after the elbow is connected to the soil-pipe.

Having thus described my invention, what I claim as new, and desire to secure by Letters Patent, is—

1. A pipe connection comprising a main pipe or elbow and two branches therefrom adapted respectively for flushing and venting and located with their axes or centers above the axis or center of the main pipe, substantially as described.

2. A pipe connection comprising a main pipe or elbow and two branches therefrom adapted respectively for flushing and venting, said branch pipes having a screw-thread connection with the main pipe and located with their axes or centers above the axis or center of the main pipe, substantially as described.

3. A pipe connection comprising a main pipe or elbow having formed integral therewith two angularly-disposed pipe-coupling thimbles adapted respectively for connection of flushing and venting pipes and located with their axes or centers above the axis or center of the main pipe, substantially as described.

4. A pipe connection comprising an elbow adapted for connection at one end with a water-closet and at the other end with a soil-pipe, and two angularly-disposed branches coupling with the soil-pipe end of the elbow and located with their central planes above its central plane or axis, substantially as described.

5. A pipe connection comprising an elbow adapted for connection at one end with a water-closet and at the other end with a soil-pipe, said elbow having two integral angularly-disposed and screw-threaded thimbles adapted to receive flushing and venting pipes and located with their central planes above the central plane or axis of the elbow, substantially as described.

In testimony that I claim the foregoing as my invention I have signed my name, in presence of two witnesses, this 4th day of February, 1898.

WILLIAM H. BURNETT.

Witnesses:
M. G. McCLEAN,
B. McCOMB.